United States Patent
Inoue et al.

(10) Patent No.: US 7,050,077 B2
(45) Date of Patent: May 23, 2006

(54) RESOLUTION CONVERSION DEVICE AND METHOD, AND INFORMATION PROCESSING APPARATUS

(75) Inventors: Kenji Inoue, Kanagawa (JP); Masaki Nakano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 434 days.

(21) Appl. No.: 10/653,902

(22) Filed: Sep. 4, 2003

(65) Prior Publication Data

US 2004/0046773 A1  Mar. 11, 2004

(30) Foreign Application Priority Data

Sep. 10, 2002  (JP) .............. 2002-264184

(51) Int. Cl.
*G09G 5/02* (2006.01)

(52) U.S. Cl. .............. 345/698; 345/660; 348/445; 348/458

(58) Field of Classification Search .............. 345/698, 345/660–671; 348/445, 458
See application file for complete search history.

(56) References Cited

U.S. PATENT DOCUMENTS

| | | | |
|---|---|---|---|
| 5,222,008 A | 6/1993 | Yamagishi et al. | 360/137 |
| 5,973,746 A * | 10/1999 | Nakamoto et al. | 348/458 |
| 6,097,438 A * | 8/2000 | Nagakubo et al. | 348/445 |
| 6,215,467 B1 | 4/2001 | Suga et al. | 345/132 |
| 6,667,773 B1 * | 12/2003 | Han | 348/441 |
| 6,937,291 B1 * | 8/2005 | Gryskiewicz | 348/581 |
| 2002/0093518 A1 | 7/2002 | Nakano | 345/643 |

FOREIGN PATENT DOCUMENTS

| | | |
|---|---|---|
| JP | 8-297477 | 11/1996 |
| JP | 11-338408 | 12/1999 |

* cited by examiner

*Primary Examiner*—Kent Chang
*Assistant Examiner*—Joseph Maresca
(74) *Attorney, Agent, or Firm*—Fitzpatrick, Cella, Harper & Scinto

(57) ABSTRACT

A line buffer unit stores the pixel values of image data for respective lines in synchronism with pixel clocks and a horizontal sync signal. An output counter generates a coordinate value to specify a pixel position in second image data based on the count value of predetermined clocks and the horizontal sync signal, and a data request unit converts the generated coordinate value into a pixel position in input image data on the basis of the set scale value. The pixel values of pixels required for arithmetic operations are acquired from the line buffer unit based on this pixel position, and an arithmetic unit calculates the pixel value of a pixel corresponding to the coordinate value. When the arithmetic unit is not ready to execute the arithmetic operation of the pixel value, generation of the coordinate value by the counter is stopped until the arithmetic unit is ready to execute the operation.

13 Claims, 15 Drawing Sheets

FIG. 8

| | | | | | | | | | | | |
|---|---|---|---|---|---|---|---|---|---|---|---|
| INPUT Hsync | | | | | | | | | | | |
| YFLAG | | | | | | | | | | | |
| INPUT LINE No. | | 4 | | 5 | | 6 | | 7 | | 8 | |
| YCOUNT | 1 | 2 | 3 | 4 | 5 | 6 | 7 | 8 | 9 | 10 | 11 |
| YQUOT | 0 | 1 | 1 | 2 | 2 | 3 | 3 | 4 | 4 | 5 | 5 |
| YREMD | 0.5 | 0 | 0.5 | 0 | 0.5 | 0 | 0.5 | 0 | 0.5 | 0 | 0.5 |
| SELECTED LINE No. | | 0,1,2,3 | | 1,2,3,4 | | 2,3,4,5 | | 3,4,5,6 | | 4,5,6,7 | |
| YEN | | | | | | | | | | | |
| OUTPUT LINE No. | | 1 | 2 | 3 | 4 | 5 | 6 | 7 | 8 | 9 | 10 |

FIG. 9

| | | | | | | | | | | | |
|---|---|---|---|---|---|---|---|---|---|---|---|
| INPUT Hsync | | | | | | | | | | | |
| YFLAG | | | | | | | | | | | |
| INPUT LINE No. | | 4 | | 5 | | 6 | | 7 | | 8 | |
| YCOUNT | 1 | 2 | 3 | 4 | 5 | 6 | 7 | 8 | 9 | | |
| YQUOT | 0 | 1 | 2 | 2 | 2 | 3 | 4 | 4 | 4 | 5 | 6 |
| YREMD | 0.6 | 0.3 | 0 | 0 | 0.6 | 0.3 | 0 | 0 | 0.6 | 0.3 | 0 |
| SELECTED LINE No. | | 0,1,2,3 | | 1,2,3,4 | | 2,3,4,5 | | 3,4,5,6 | | 4,5,6,7 | |
| YEN | | | | | | | | | | | |
| OUTPUT LINE No. | | 1 | | 2 | 3 | 4 | | 5 | 6 | 7 | |

RESOLUTION CONVERSION DEVICE AND METHOD, AND INFORMATION PROCESSING APPARATUS

FIELD OF THE INVENTION

The present invention relates to resolution conversion in image display on a computer, television, and the like.

BACKGROUND OF THE INVENTION

In general, a computer can display a plurality of resolutions in correspondence with that of a display device. For example, if the maximum resolution of the display device is XGA, the computer is often required to display images of the XGA resolution or lower (VGA, SVGA). This is to allow the user to select a desired resolution to display more information on a screen or to display in a larger scale so that he or she can view an image more easily.

In this case, a resolution conversion technique is required for the computer main body to provide a desired resolution to the display device.

As for televisions, an NTSC scheme is adopted in Japan. In NTSC, the number of scan lines ranges from 483 to 485, the number of pixels per scan line ranges from 720 to 760, and the total number of pixels is about 350,000. Since display is normally attained by interlaced scans, the practical resolution is about 150,000 pixels.

By contrast, in recent years, a Hi-Vision scheme has prevailed. The Hi-Vision scheme is also called HD, and assures a resolution of about 750,000 pixels. The conventional NTSC broadcast is called SD in correspondence with HD.

Furthermore, in digital broadcast, image formats such as 480i, 720p, and 1080i are available. 480i indicates 640×480 interlaced scans, 720p indicates 1,024×720 progressive scans, and 1080i indicates 1,280×1,080 interlaced scans.

In addition, there are many applications such as image display of personal computers, video display of games and digital cameras, and multi-frame display for displaying a plurality of frames, and the chances of displaying many image formats on a television are increasing.

Note that analog data of the conventional NTSC broadcast can relatively easily undergo image format conversion by changing the sampling rate. However, in order to attain format conversion of digital data such as digital broadcast, digital camera images, and the like, image data must undergo interpolation and decimation.

Also, in order to provide a display effect such as multi-frame display, resolution conversion for enlarging/reducing an image is required together with the image format conversion.

In general, a large frame memory is required to execute such resolution conversion. In order to execute resolution conversion without any frame memory, all processes must be done within 1V (one vertical period) of an input image. If the processing time exceeds 1V, the next frame process is influenced, and a large memory is consequently required. An example of resolution conversion which is made without using any frame memory is proposed by, e.g., "Scan Converter" (Japanese Patent Laid-Open No. 11-338408) and the like. However, the scheme proposed by this reference focuses on image formation conversion, but does not aim at achievement of higher image quality when the user makes desired resolution conversion.

In order to aim at achievement of higher image quality, a method of referring to a plurality of pixels is generally used. Interpolation by referring to only a single pixel is merely prediction from that pixel. However, when a plurality of pixels are used, changes in pixels before and after the pixel position to be interpolated can be used, and the reliability of prediction can be improved. If two reference pixels are used, a change in pixel at that time can be expressed by a line; if three or more reference pixels are used, it can be expressed by a curve.

As such interpolation method that refers to a plurality of pixels, linear interpolation, three-dimensional (3D) convolution, and the like are known. Linear interpolation interpolates a pixel using two pixels (4 pixels in a matrix), and 3D convolution interpolates a pixel from four pixels (16 pixels in a matrix). In general, the image quality becomes higher but arithmetic processes become more complicated with increasing number of reference pixels.

The convolution arithmetic operation will be explained below. The convolution arithmetic operation uses 16 pixels in a source image and eight coefficients per output pixel.

If we have:

pre-conversion coordinates: x, y post-conversion coordinates: X, Y conversion formulas: $X=A^*x$, $Y=B^*y$ ($A$: x-scale, $B$: y-scale)

since the pre-conversion coordinates (x, y) are discontinuous numbers and the post-conversion coordinates (X, Y) are continuous numbers in practice, the pre-conversion coordinates are obtained using inverse conversion formulas:

$$x=X/A$$

$$y=Y/B$$

The integral part of each inverse conversion result is used to derive the pixel value of the source image as a pre-conversion coordinate. The decimal part (remainder) is used to generate a coefficient.

For each pixel (X, Y), 16 source image pixel values G are acquired from source image coordinates (x, y).

|          | column x − 1 | column x | column x + 1 | column x + 2 |
|----------|--------------|----------|--------------|--------------|
| row y − 1 | $G_{11}$ | $G_{21}$ | $G_{31}$ | $G_{41}$ |
| row y     | $G_{12}$ | $G_{22}$ | $G_{32}$ | $G_{42}$ |
| row y + 1 | $G_{13}$ | $G_{23}$ | $G_{33}$ | $G_{43}$ |
| row y + 2 | $G_{14}$ | $G_{24}$ | $G_{34}$ | $G_{44}$ |

Let x−[x] and y−[y] be the decimal parts of values obtained by inverse conversion. Then, coefficients f(t) are calculated by:

$$x1 = 1 + (x - [x]) \quad y1 = 1 + (y - y[y])$$
$$x2 = (x - [x]) \quad y2 = (y - [y])$$
$$x3 = 1 - (x - [x]) \quad y3 = 1 - (y - [y])$$
$$x4 = 2 - (x - [x]) \quad y4 = 2 - (y - [y])$$

$$f(t) \approx \begin{cases} 1 - 2|t|^2 + |t|^3 & (0 \le |t| < 1) \\ 4 - 8|t| + 5|t|^2 - |t|^3 & (1 \le |t| < 2) \\ 0 & (2 \le |t|) \end{cases}$$

From the above 16 pixel values ($G_{11}$ to $G_{44}$) of the source image and eight coefficients (x1 to x4i, y1 to y4), a pixel value P of an image after conversion is calculated by:

$$P = (f(y_1)f(y_2)f(y_3)f(y_4)) \begin{pmatrix} G_{11} & G_{21} & G_{31} & G_{41} \\ G_{12} & G_{22} & G_{32} & G_{42} \\ G_{13} & G_{23} & G_{33} & G_{43} \\ G_{14} & G_{24} & G_{34} & G_{44} \end{pmatrix} \begin{pmatrix} f(x_1) \\ f(x_2) \\ f(x_3) \\ f(x_4) \end{pmatrix}$$

Note that 3D arithmetic operations are required to calculate the coefficients. In order to reduce this calculation volume, conditional selection may be made from the first x–[x] and y–[y] values, and fixed coefficients may be selected from a coefficient table, which is calculated in advance.

As described above, the convolution arithmetic operation requires 16 pixel values of the source image per output pixel. A method of reading out these 16 pixel values changes depending on scales, and identical pixels are often multiplied by different coefficients. For this reason, a method of sequentially processing input pixels cannot be used. Hence, a frame memory or a plurality of line buffers are required.

A method of making such 3D convolution arithmetic operations without using any frame memory is also proposed by "Display Control Apparatus and Method, and Display Apparatus" (Japanese Patent Laid-Open No. 8-297477). This reference has proposed a method of implementing resolution conversion based on 3D convolution arithmetic operations using only line buffers by providing a plurality of arithmetic processors.

However, since the convolution arithmetic operations require many multiplication processes and the circuit is complicated, the apparatus of Japanese Patent Laid-Open No. 8-297477 which comprises a plurality of arithmetic processors requires a large circuit scale.

When arithmetic operations are made using a single arithmetic processor without any frame memory, resolution conversion up to twice in the vertical and horizontal directions can be attained if arithmetic processes are executed using clocks about four times of input pixel clocks. However, in case of the convolution arithmetic operations, 4 (vertical)×4 (horizontal) pixels must be read per pixel. Pixels in the vertical direction can be simultaneously read out as long as a required number of line buffers are prepared. However, one pixel (column) can only be read out per clock in the horizontal direction.

In the above situation, it is demanded to make a single arithmetic circuit execute a plurality of different types of resolution conversion using line buffers.

Also, it is especially demanded to make a single arithmetic circuit execute a plurality of different types of resolution conversion based on 3D convolution arithmetic operations using line buffers.

SUMMARY OF THE INVENTION

According to one aspect of the present invention, there is provided a resolution conversion device comprising: a plurality of line buffers for sequentially storing pixel values of first image data for respective lines in synchronism with pixel clocks and a horizontal sync signal; a generation unit configured to sequentially generate a coordinate value used to specify a pixel position in second image data on the basis of a count value of predetermined clocks and the horizontal sync signal; a conversion unit configured to convert the coordinate value generated by the generation unit into a pixel position in the first image data on the basis of a scale value of resolution conversion; an arithmetic unit configured to acquire pixel values of pixels required for an arithmetic operation from the plurality of line buffers on the basis of the pixel position obtained by the conversion unit, and calculate a pixel value of a pixel corresponding to the coordinate value; and a stop unit configured to, when the arithmetic unit is not ready to execute the arithmetic operation of a pixel value, stop generation of the coordinate value by the generation unit until the arithmetic unit is ready to execute the arithmetic operation.

According to another aspect of the present invention, there is provided a resolution conversion method comprising: a storage step of sequentially storing pixel values of first image data in a plurality of line buffers for respective lines in synchronism with pixel clocks and a horizontal sync signal; a generation step of sequentially generating a coordinate value used to specify a pixel position in second image data on the basis of a count value of predetermined clocks and the horizontal sync signal; a conversion step of converting the coordinate value generated in the generation step into a pixel position in the first image data on the basis of a scale value of resolution conversion; an arithmetic step of acquiring pixel values of pixels required for an arithmetic operation from the plurality of line buffers on the basis of the pixel position obtained in the conversion step, and calculating a pixel value of a pixel corresponding to the coordinate value; and a stop step of stopping, when the arithmetic operation of a pixel value is not ready to execute in the arithmetic step, stopping generation of the coordinate value in the generation step until the arithmetic operation of a pixel value is ready to execute in the arithmetic step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a timing chart upon setting 2× in the y-direction in a resolution conversion process of this embodiment;

FIG. 9 is a timing chart upon setting 1.5× in the y-direction in a resolution conversion process of this embodiment;

DETAILED DESCRIPTION OF THE PREFERRED EMBODIMENTS

Preferred embodiments of the present invention will now be described in detail in accordance with the accompanying drawings.

This embodiment implements a plurality of different types of resolution conversion using convolution arithmetic operations by a single arithmetic processor while avoiding an increase in memory. An outline of the arrangement and operation will be described below with reference to FIG. 1.

Figure 1:
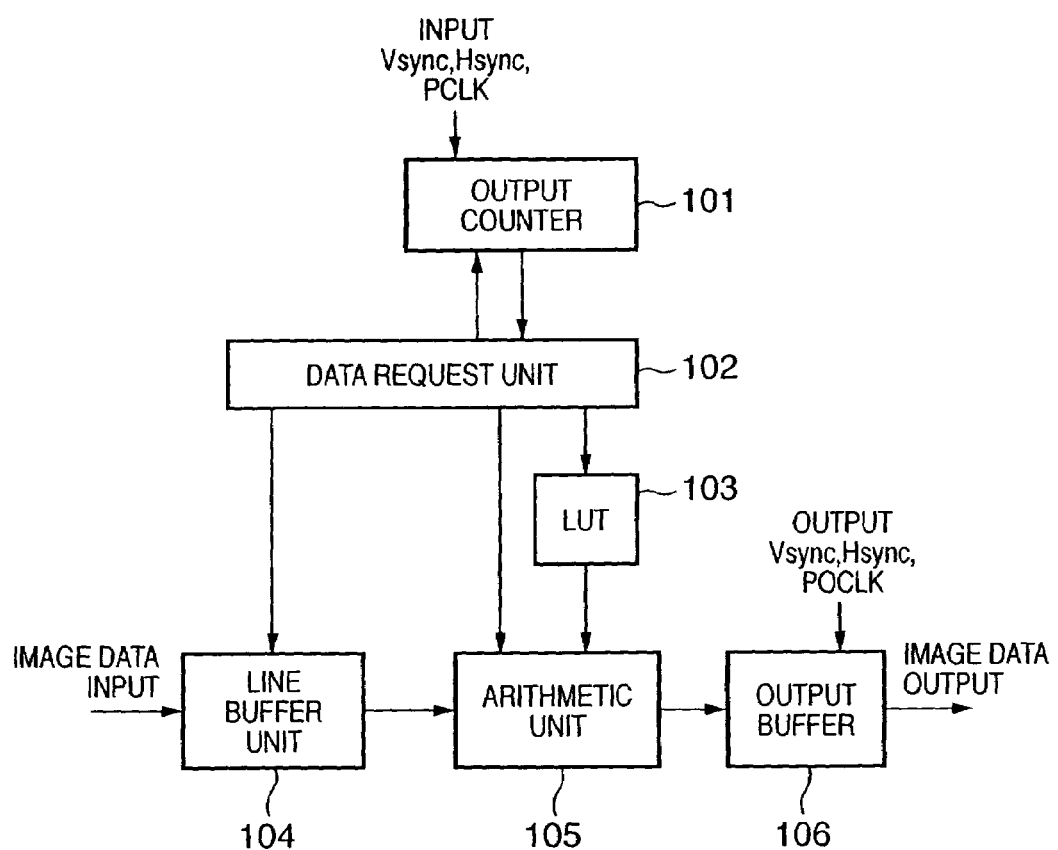
FIG. 1 is a block diagram showing the arrangement of a resolution conversion device according to an embodiment of the present invention.

FIG. 1 is a block diagram showing the arrangement of a resolution conversion device according to this embodiment. Image data which is to undergo resolution conversion is input to a line buffer unit 104, and image data that has undergone resolution conversion is output from an output buffer 106. The line buffer unit 104 will be described in detail later with reference to FIGS. 2 and 3.

The line buffer unit 104 receives pixel data of a source image in response to input pixel clocks and Hsync, and stores image data for a plurality of lines. On the other hand, an output counter 101 counts the number of bits in the x-direction and the number of lines in the y-direction of output image data on the basis of arithmetic pixel clocks and Hsync. A data request unit 102 converts the count values into request data. More specifically, each count value is divided by a set scale to separate request data into a QUOT (quotient) signal and REMD (remainder) signal. Of these signals, the QUOT signal is used to issue an image data request to the line buffer unit 104, and the REMD signal is used to issue a coefficient data request for 3D convolution arithmetic operations.

The data request unit 102 determines the feasibility of 3D convolution arithmetic operations using pixel data designated by the generated request data. For example, the feasibility is determined based on whether or not lines requested by the request data have already been stored in the line buffer unit 104. An enable signal indicating this determination result is sent to the output counter 101 to control its count timing.

A sequence for reading out data by the QUOT signal generated from the data request unit 102 will be described below. The QUOT signal represents x- and y-coordinate addresses calculated by the data request unit 102: XQUOT represents the x-direction, and YQUOT, the y-direction.

In the y-direction, it is determined if the count value of input horizontal sync signals (Hsync) matches a maximum line number requested based on QUOT (YQUOT) of the y-direction. If the two values match, four line buffers (YQUOT−1, YQUOT, YQUOT+1, YQUOT+2) corresponding to YQUOT are selected from a plurality of line buffers which store data. If the two values do not match, an enable signal is controlled to stop the count process of the output counter, and the control waits until image data of lines corresponding to YQUOT are input.

In the x-direction, x-coordinate data (XQUOT−1, XQUOT, XQUOT+1, and XQUOT+2) designated by QUOT (XQUOT) of the x-direction are sequentially read out from the four line buffers selected by YQUOT. That is, four pixel data are read out for each x-coordinate data, and the readout data are sent to an arithmetic unit 105.

The arithmetic unit 105 executes an arithmetic process of the received four pixel data for convolution arithmetic operations using coefficients obtained based on the REMD signal, and holds the arithmetic operation result in a register. The arithmetic unit 105 includes four registers (404 to 407 in FIG. 4), which are designed to erase older data in turn upon reception of new data, like in a FIFO.

Whether or not new data is input to the arithmetic unit 105 is controlled by the data request unit 102. For example, if XQUOT designates the same address, no new data is input to the arithmetic unit 105; if an address different from that of an immediately preceding clock is designated, new data is input to the arithmetic unit 105.

The data request unit 102 controls the arithmetic unit 105 not to output the arithmetic result depending on the set scale even when new data is input to the arithmetic unit 105.

For example, a case will be examined wherein ¼ reduction is to be made in the x-direction. An arithmetic operation of each pixel uses four pixel data in the x-direction. In case of ¼ reduction, one pixel is generated using four pixels in the X-direction. Hence, after the arithmetic operation required to generate one pixel, all the four pixel data used in the previous arithmetic operation are replaced in the next arithmetic operation.

At this time, since pixel data is read out from each line buffer by designating its x-coordinate by XQUOT, it is difficult to read out four pixel data by one clock. If four pixel data are to be read out by one clock, four line buffers which store identical data must be prepared. Hence, four clocks are required to replace all four pixel data.

Therefore, the arithmetic result must be inhibited from being output during a 3-clock period in which replacement of data is underway. Thus, an enable signal to the output counter is controlled to inhibit the next count until arithmetic data are prepared.

In this way, since the data request unit 102 controls the timings of the output counter 101, line buffer unit 104, and arithmetic unit 105, a resolution conversion circuit that implements resolution conversion based on convolution arithmetic operations using several line buffers can be provided.

The resolution conversion device of this embodiment will be described in more detail below.

Referring to FIG. 1, reference numeral 101 denotes an output counter; 102, a data request unit; 103, a lookup table (to be abbreviated as an LUT hereinafter); 104, a line buffer unit; 105, an arithmetic unit; and 106, an output buffer.

The output counter 101 receives a vertical sync signal (to be referred to as Vsync hereinafter), horizontal sync signal (to be referred to as Hsync hereinafter), and PCLK serving as arithmetic pixel clocks. Note that the user can externally set an arbitrary frequency as PCLK. However, in order to allow resolution conversion up to twice in both the vertical and horizontal directions, PCLK having a frequency about 4 times that of pixel clocks (PICLK) of an input image is required.

The output counter 101 counts up x- and y-coordinate values from 0 to output image sizes set by the user. At this time, the count-up timing is synchronous with PCLK in the x-direction, and Hsync in the y-direction (strictly speaking, YFLAG (to be described later)). Data of the count values counted by the output counter 101 are sent to the data request unit 102. The count value in the X-direction is reset by Hsync (YFLAG), and the count value in the Y-direction is reset by the vertical sync signal Vsync.

The data request unit 102 generates request data from x- and y-count values. The request data are generated using:

$$XCOUNT/XZOOM=XQUOT \ldots XREMD \quad (1)$$

$$YCOUNT/YZOOM=YQUOT \ldots YREMD \quad (2)$$

where XCOUNT is the count value in the x-direction generated by the output counter 101, XZOOM is the scale in the x-direction, XQUOT is the quotient of the above calculation, and XREMD is the remainder value. YCOUNT, YZOOM, YQUOT, and YREMD represent values with the same contents as above in the y-direction. The XQUOT, XREMD, YQUOT, and YREMD calculated in this manner are used as request data.

If coordinates (XCOUNT, YCOUNT) are used to resemble coordinate data after resolution conversion, (XQUOT, YQUOT) can be considered as coordinates near coordinate data after conversion in a pre-conversion image. At this time, if XREMD and YREMD are zero, XQUOT and YQUOT are equal to pre-conversion coordinate values. That is, XREMD and YREMD represent distances between post-conversion coordinates (XCOUNT, YCOUNT) and pre-conversion coordinates (XQUOT, YQUOT).

The data request unit 102 monitors the generated XQUOT and YQUOT signals, and feeds back an enable signal generated based on these signals to the output counter 101. A method of generating an enable signal at that time will be described later.

The XREMD and YREMD signals are sent to the LUT 103. The LUT 103 is a coefficient table in which convolution arithmetic coefficients calculated in advance are registered, and outputs four coefficients which are uniquely determined for input XREMD and YREMD. The coefficient data output from the LUT 103 are sent to the arithmetic unit 105.

On the other hand, the XQUOT and YQUOT are sent to the line buffer unit 104. The line buffer unit 104 comprises four or more line buffers which store input image data. The line buffer unit 104 assigns one line buffer per input Hsync. In this way, four or more line buffers always store pixel data of different lines.

The stored data for respective lines are assigned line addresses to have Vsync as a start point. This line address corresponds to YQUOT. The line buffer unit 104 selects line buffers with line addresses YQUOT−1, YQUOT, YQUOT+1, and YQUOT+2 based on input YQUOT from the stored line buffers. Note that an identical line buffer is kept selected throughout one line.

At this time, the line addresses of the line buffers stored in the line buffer unit 104 are monitored by the data request unit 102. If data of the required line addresses are not input to the line buffer unit 104 yet, the data request unit 102 controls an enable signal to stop the count-up process of the output counter 101. Note that the required line addresses are line address data YQUOT−1, YQUOT, YQUOT+1, and YQUOT+2 in this embodiment. Since the line buffer unit 104 line-sequentially stores data, whether or not data of line YQUOT+2 are stored in the line buffer unit 104 can be checked in practice. After data of the required line addresses are stored, the data request unit 102 controls to restart the count-up process of the output counter 101.

The line buffer unit 104 reads out pixel data corresponding to XQUOT from the selected line buffers. Data stored in each line buffer are assigned bit addresses to have Hsync as a start point. At this time, correspondence between XQUOT and bit addresses differs depending on scales. A method of determining the correspondence will be described later.

Data read out from the line buffer unit 104 are sent to the arithmetic unit 105. The arithmetic unit 105 calculates pixel data after resolution conversion by convolution arithmetic operations using the coefficient data from the LUT 103 and the pixel data from the line buffer unit 104. The calculated pixel data is output to the output buffer 106.

The output buffer 106 temporarily stores pixel data generated based on arithmetic pixel clocks (PCLK). The stored data are sequentially output in accordance with Vsync, Hsync, and pixel clocks (POCLK) used to output data to the display device. In this way, data after resolution conversion are generated.

When the resolution conversion device shown in FIG. 1 is applied to an information processing apparatus, upon displaying, on a display, image data generated under the control of a CPU, an arrangement which inputs the generated image data to the line buffer unit 104 and displays image data after resolution conversion stored in the output buffer 106 can be obtained. In this way, the CPU need not change the resolution of image data in correspondence with that of the display as an output destination.

The respective blocks will be described below.

Figure 2:
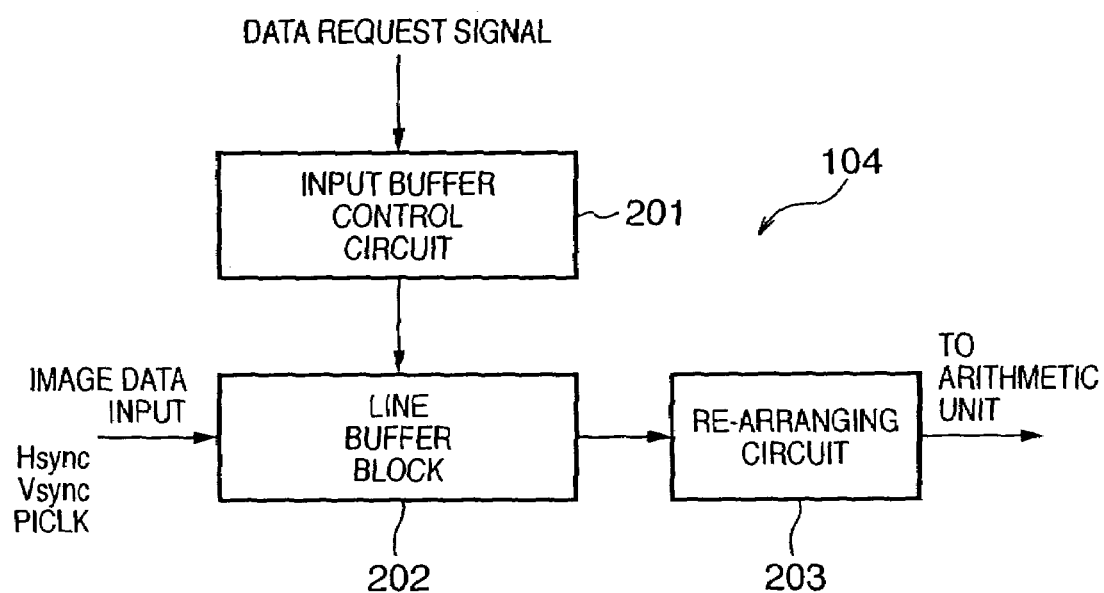
FIG. 2 is a block diagram showing an example of the arrangement of a line buffer unit 104.

FIG. 2 shows the structure of the line buffer unit 104. Referring to FIG. 2, reference numeral 201 denotes an input buffer control circuit; 202, a line buffer block; and 203, a re-arranging circuit. The line buffer block 202 has a plurality of line buffers, which hold pixel data for respective lines in synchronism with Hsync, Vsync, and input pixel clocks PICLK.

The input buffer control circuit 201 selects line buffers of corresponding line addresses from the line buffer block 202 on the basis of the data request signal YQUOT of the y-direction, and sequentially reads out data from the selected line buffers. At this time, the readout data are counted, and when a requirement of the data request signal XQUOT of the x-direction is met, arithmetic operations in the x-direction start.

The line buffer block 202 represents a memory which has a capacity that can store five or more lines, can select respective lines, and can simultaneously read out data of a designated bit address from the plurality of selected (four in this case) lines.

Figure 3:
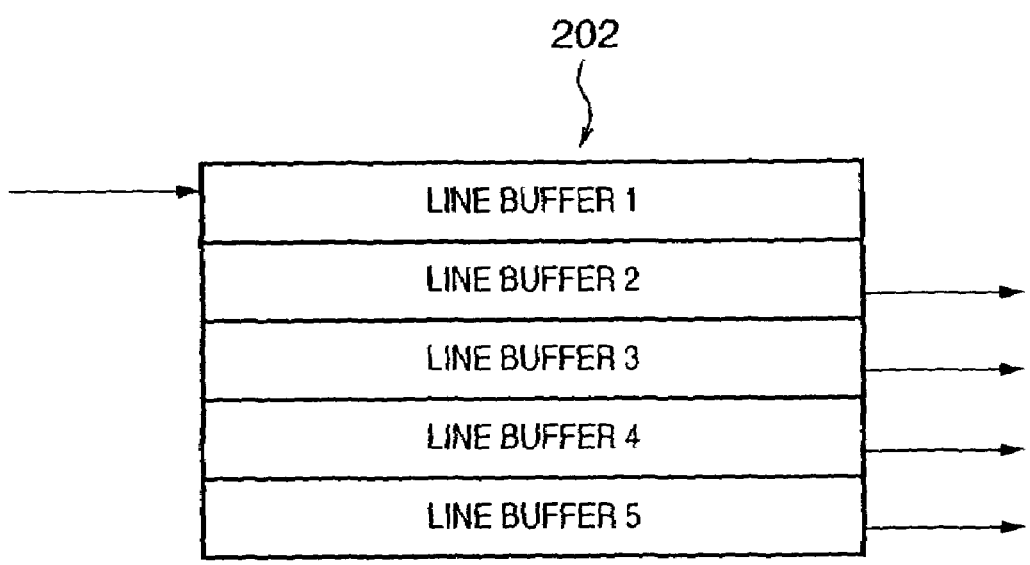
FIG. 3 is a diagram for explaining the arrangement and data flow of a line buffer block 202.

FIG. 3 is a diagram for explaining the arrangement and operation of the line buffer block 202. FIG. 3 shows a structure in which the line buffer block 202 has line buffers for five lines.

FIG. 3 illustrates a state wherein line buffer 1 is storing input data, and pixel data are being read out from remaining four line buffers 2 to 5.

In response to the next Hsync, input data are stored in line buffer 2, and data are read out from remaining line buffers 1, 3, 4, and 5. In response to the second next Hsync, input data are stored in line buffer 3, and data are read out from remaining line buffers 1, 2, 4, and 5. In this way, latest data for four lines are sequentially stored in the line buffers.

Data of an identical bit address of those for four lines are read out from the line buffer block 202. At this time, the arrangement of data varies depending on from which of line buffers data are to be read out. Since the subsequent arithmetic unit 105 multiplies these pixel data by corresponding convolution arithmetic coefficients, the data must be arranged in a given order. The re-arranging circuit 203 re-arranges data read out from the line buffers in ascending order of a time series, and outputs the re-arranged data to the arithmetic unit 105.

Figure 4:
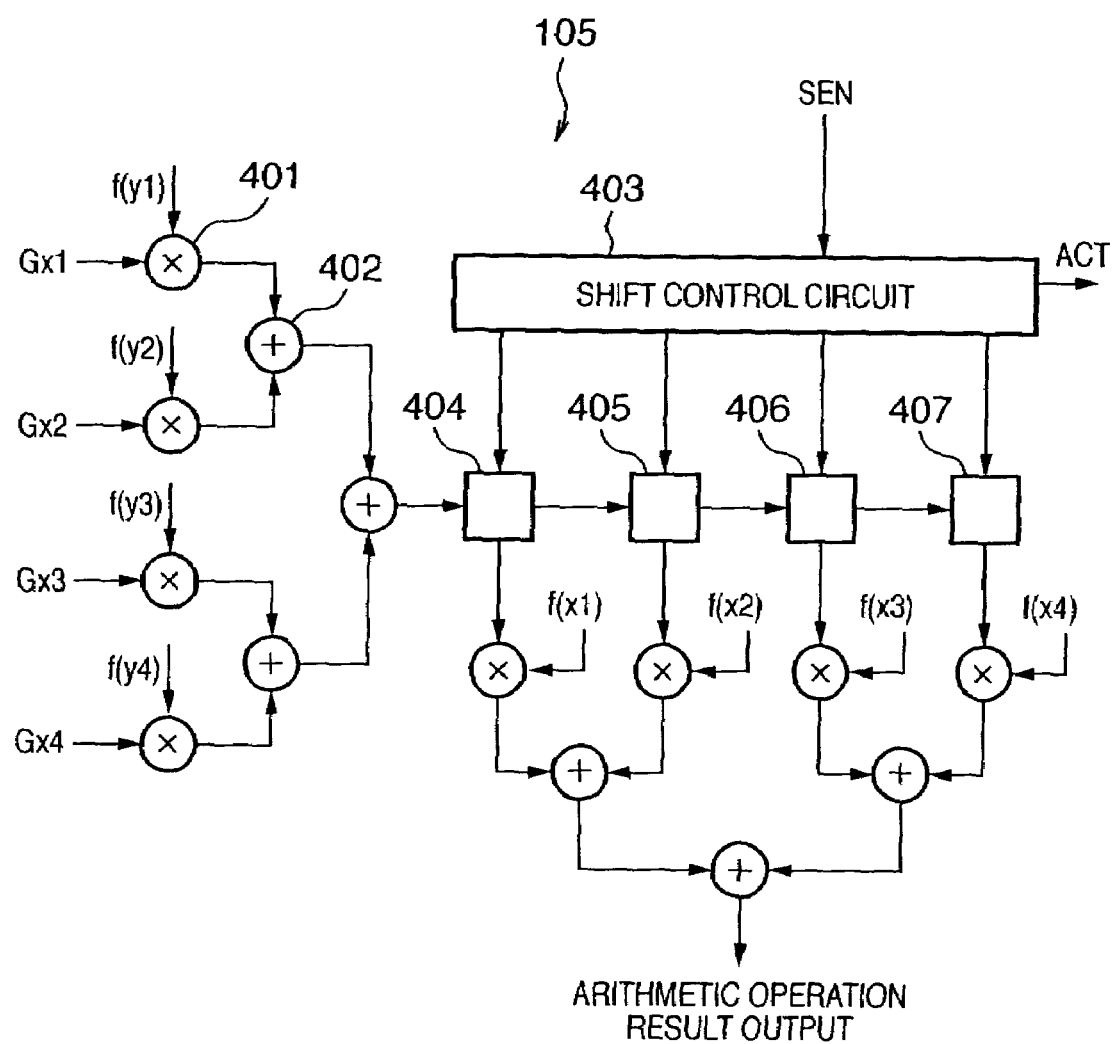
FIG. 4 is a block diagram showing an example of the arrangement of an arithmetic unit 105.

FIG. 4 shows the structure of the arithmetic unit 105. Referring to FIG. 4, reference numeral 401 denotes multipliers (components indicated by identical symbols in FIG. 4 have the same arrangements); 402, adders; 403, a shift control circuit; 404, a first register; 405, a second register; 406, a third register; and 407, a fourth register. Also, in FIG. 4, GX1, GX2, GX3, and GX4 represent pixel data read out from the line buffer unit 104, f(y1), f(y2), f(y3), and f(y4) represent coefficient data of the y-direction, and f(x1), f(x2), f(x3), and f(x4) represent coefficient data of the x-direction.

When pixel data GX1, GX2, GX3, and GX4 are input, they are respectively multiplied by the coefficient data f(y1), f(y2), f(y3), and f(y4) of the y-direction. At this time, corresponding data are determined: GX1 is multiplied by f(y1), GX2 is multiplied by f(y2), and so forth. The identical coefficient of the y-direction is used in one line. The multiplied data are added to each other, and the sum is stored in the first register 404.

When new pixel data GX1, GX2, GX3, and GX4 are input in response to the next clock, inner product arithmetic operations are made in the same manner as above, and new arithmetic data is stored in the first register 404. At this time, the old data stored in the first register 404 has already been shifted to and stored in the second register 405. Furthermore, data already stored in the second register 405 is overwritten on and stored in the third register 406, and that stored in the third register 406 is overwritten on and stored in the fourth register 407.

After data are stored in the first to fourth registers 404 to 407 in this way, the data in these registers are respectively multiplied by the corresponding coefficients f(x1), f(x2), f(x3), and f(x4) of the x-direction, and the sum of these products is output as the arithmetic operation result.

Since these processes are attained by pipeline processes, arithmetic data for one pixel can be output per clock.

For a given scale, identical pixel data is successively input for several clocks. At this time, the shift control circuit 403 controls not to accept new data on the basis of a shift enable signal (SEN) sent from the data request unit 102.

Also, for another scale, pixel data must be shifted not one by one but by several pixels. However, only one pixel data can be input in response to one clock. That is, when one pixel is input in response to one clock, and is shifted to one register, valid values as arithmetic data become discrete with respect to clocks. Hence, the shift control circuit 403 generates an active signal (ACT) to control it. The ACT signal goes high when output pixel data is valid, and goes low when output data is invalid. When output pixel data discretely output valid data, as described above, the ACT signal is controlled accordingly.

A pair of the ACT signal and output pixel data are sent to the output buffer 106. When the ACT signal is high, the output pixel data is written; when the ACT signal is low, the output pixel data is not written.

Figure 5:
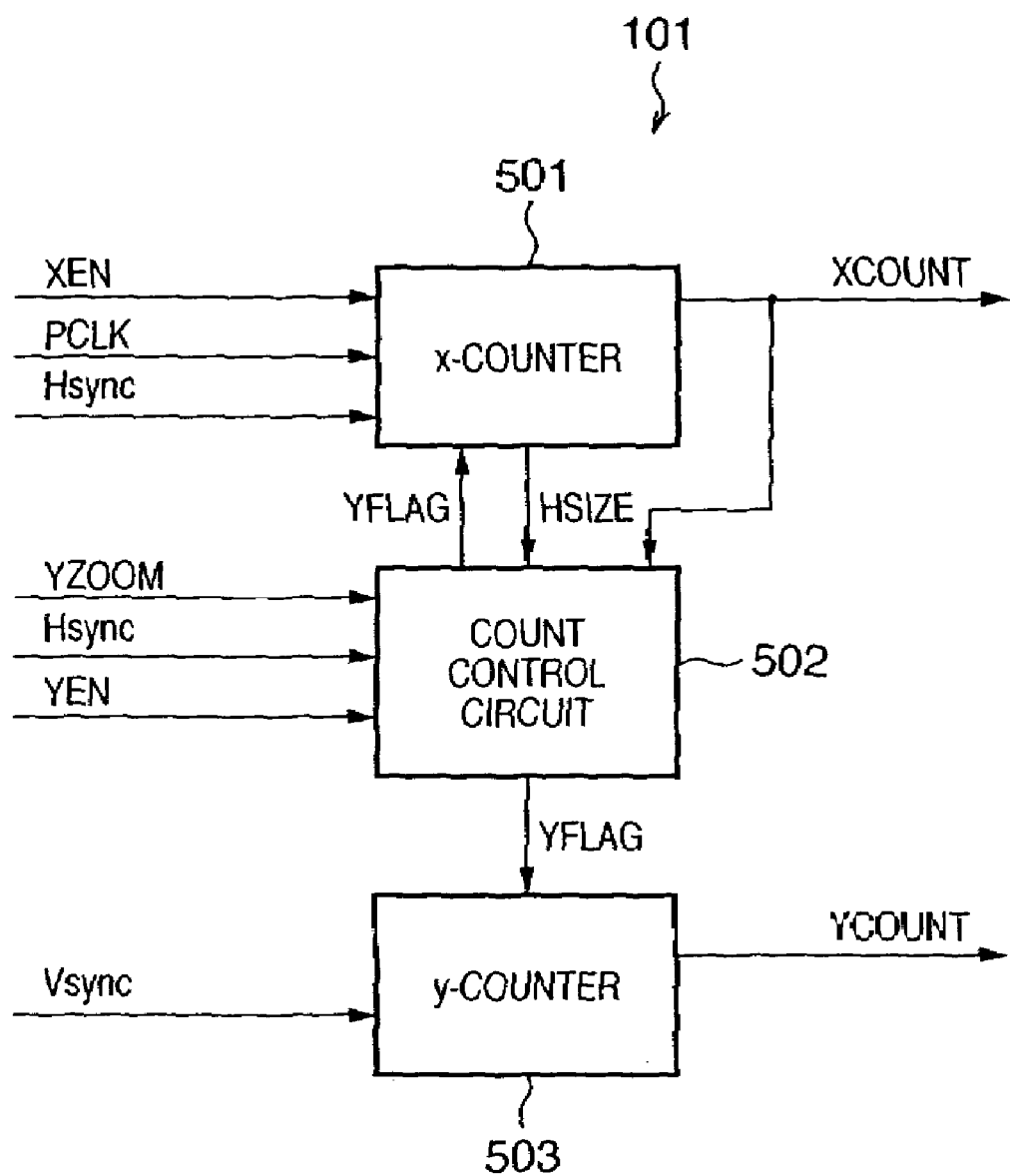
FIG. 5 is a block diagram showing an example of the arrangement of an output counter 101.

FIG. 5 is a block diagram showing an example of the arrangement of the output counter 101. In FIG. 5, reference numeral 501 denotes a counter of the x-direction (to be referred to as an x-counter hereinafter); 502, a count control circuit; and 503, a counter of the y-direction (to be referred to as a y-counter hereinafter).

The x-counter 501 counts up arithmetic pixel clocks (PCLK) within an effective image region of Hsync to have input Hsync as a start point, and outputs the count value as XCOUNT. At this time, execution of the count process is controlled in accordance with an enable signal (XEN) of the x-direction fed back from the data request unit 102. That is, when XEN is high, the x-counter 501 is controlled to count up clocks; when XEN is low, the x-counter 501 is controlled not to count up clocks. The count value of the x-counter 501 is reset to zero by YFLAG (to be described later).

Also, the x-counter 501 stores a value (HSIZE) indicating the count value of PCLK irrespective of XEN within the effective image region of previous Hsync. This HSIZE signal is sent to the count control circuit 502.

The count control circuit 502 generates a YFLAG signal on the basis of the aforementioned HSIZE signal, input Hsync, the scale of the y-direction (YZOOM), an enable signal (YEN) of the y-direction fed back from the data request unit 106, and the XCOUNT value.

The y-counter 503 counts up the leading or trailing edges of the YFLAG signal within an effective image region of Vsync to have input Vsync as a start point. The count-up value is output as YCOUNT. In this embodiment, whether or not to output YFLAG is controlled by YEN so as to consequently control the count-up process of the y-counter 503. Alternatively, YFLAG may be output irrespective of YEN, and YEN may be supplied to y-counter 503 to control its count-up process.

Figure 6:
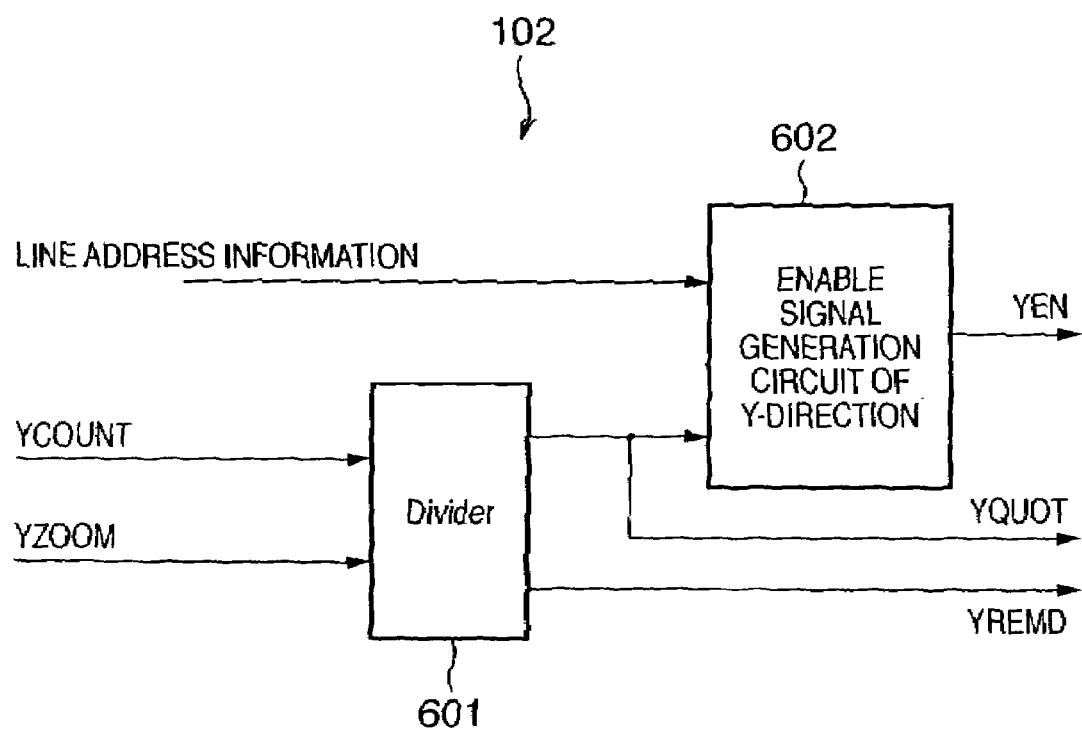
FIG. 6 is a block diagram showing the arrangement associated with the Y-direction in a data request unit 102.

The data request unit 102 will be described below. FIG. 6 partially shows the data request unit, i.e., the structure of a counter controller of the y-direction.

Referring to FIG. 6, reference numeral 601 denotes a divider; and 602, an ENABLE signal generation circuit of the y-direction. The divider 601 receives the count value of the y-direction (YCOUNT) generated by the output counter 101, and a scale of the y-direction (YZOOM) which is arbitrarily designated by the user.

The divider 601 does division in accordance with equation (2) above to generate YQUOT and YREMD signals. The ENABLE signal generation circuit 602 receives line address information from the line buffer unit 104 and YQUOT generated by the divider 601. The line address information indicates a line address that currently undergoes write access, and also that data for four lines before this line address have already been stored in the line buffer unit 104.

The ENABLE signal generation circuit 602 compares the line address information with YQUOT, and if $$\text{line address information} = YQUOT+3 \quad (3)$$

it is determined that data which allow arithmetic operations have been stored in the line buffer unit, and the circuit 602 sets the enable signal (YEN) of the y-direction to high.

On the other hand, if $$\text{line address information} < YQUOT+3 \quad (4)$$

since storage of data for line YQUOT+2 is not complete yet, the ENABLE signal generation circuit 602 sets YEN to low to pause the count-up process of YCOUNT until the condition of equation (3) is met.

Figure 7:
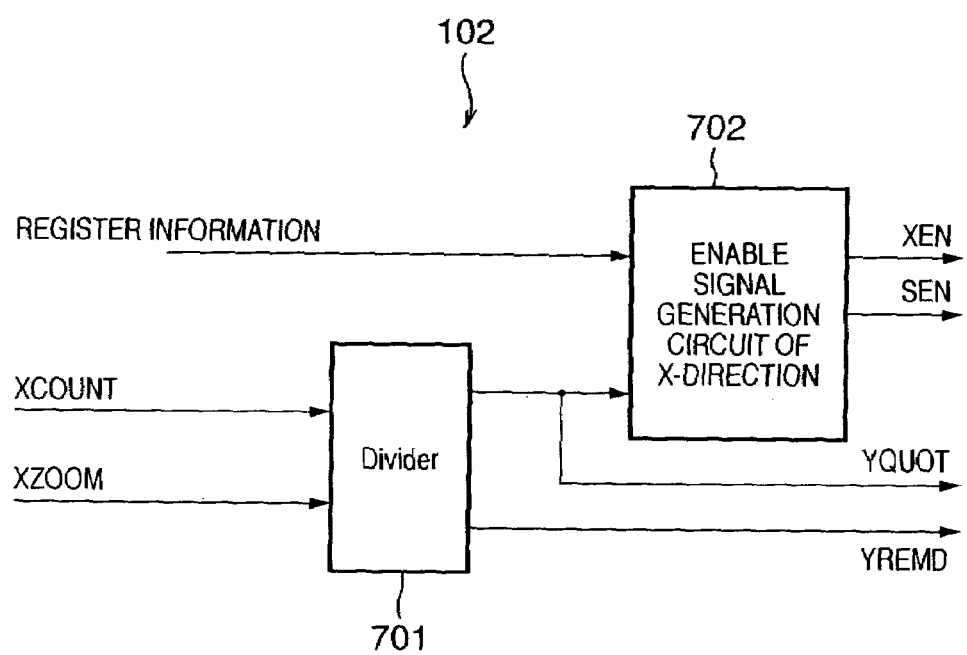
FIG. 7 is a block diagram showing the arrangement associated with the X-direction in the data request unit 102.

FIG. 7 partially shows the data request unit 102, i.e., the structure of a counter controller of the x-direction. Reference numeral 701 denotes a divider;

and 702, an ENABLE signal generation circuit of the x-direction.

The divider 701 receives the count value of the x-direction (XCOUNT) generated by the output counter 101, and a scale of the x-direction (XZOOM) which is arbitrarily designated by the user. The divider 701 does division in accordance with equation (1) above to generate XQUOT and XREMD signals.

The ENABLE signal generation circuit 702 receives register information from the arithmetic unit 105 and XQUOT generated by the divider 701. The register information indicates a pixel address corresponding to data stored in the first register 404 as the latest register of the arithmetic unit 105. This register information indicates that data at this pixel address and data for three pixels before this address are stored in the four registers of the arithmetic unit 105.

The ENABLE signal generation circuit 702 compares the register information with XQUOT, and if $$\text{register information}=XQUOT+2 \quad (5)$$

it is determined that data which allow arithmetic operations have been stored in the arithmetic unit 105, and the circuit 702 sets the enable signal (XEN) of the x-direction to high.

On the other hand, if $$\text{register information}<XQUOT+2 \quad (6)$$

the ENABLE signal generation circuit 702 sets XEN to low to pause the count-up process of XCOUNT until the condition of equation (5) is met.

The ENABLE signal generation circuit 702 monitors if XQUOT continuously assumes an identical value while XEN is enabled. If XQUOT assumes an identical value, the circuit 702 changes the shift enable signal (SEN) to low to inhibit the shift control circuit 403 of the arithmetic circuit 105 from receiving new data. In this way, no shift operations of the first to fourth registers (404 to 407) occur.

FIGS. 8 to 15 are detailed timing charts showing the aforementioned operations. The operation of the resolution conversion device of this embodiment will be described in more detail below with reference to these timing charts.

FIG. 8 is a timing chart upon enlarging the y-direction to 2×. In FIG. 8, YFLAG is a signal generated by the count control circuit 502 in FIG. 5, YCOUNT is a signal generated by the y-counter 503, and YQUOT and YREMD are signals generated by the divider 601 in FIG. 6. Also, YEN is a signal generated by the ENABLE signal generation circuit 602.

While the enlargement scale YZOOM in the y-direction falls within the range 1×≦YZOOM≦2×, a signal that equally divides the effective pixel period of input Hsync into two is generated as YFLAG. Such signal is generated by setting YFLAG in synchronism with Hsync, monitoring the count value (XCOUNT) of the x-counter 501 and setting YFLAG when the count value reaches ½ of the number of pixels indicated by HSIZE. While YZOOM falls within the range 2×<YZOOM≦3×, a signal that equally divides input Hsync into three is generated as YFLAG. Such signal is generated by setting YFLAG in synchronism with Hsync, monitoring the count value (XCOUNT) of the x-counter 501 and setting YFLAG when the count value reaches ⅓ and ⅔ of the number of pixels indicated by HSIZE.

The above signal is used as a basic pattern, and a signal obtained by data-masking the above signal by the YEN signal is output as YFLAG. YCOUNT is obtained by counting up the leading or trailing edges of this YFLAG.

In FIG. 8, when YCOUNT=2, YQUOT=1. Since line addresses to be read out from the line buffers indicate four lines, i.e., YQUOT−1, YQUOT, YQUOT+1, and YQUOT+2, data of line addresses 0, 1, 2, and 3 are read out. Also, when YCOUNT=3, YQUOT=1. At this time as well, data of line addresses 0, 1, 2, and 3 are read out.

These data can be processed during a period of input line address=4. That is, data for two lines can be output during 1H (one horizontal period).

Hence, when the 2× scale is set in the y-direction, the YEN signal is always high, and YFLAG is output at timings shown in FIG. 8. Hence, output lines are successively output.

FIG. 9 is a timing chart upon enlarging the y-direction to 1.5×. In FIG. 9, when YCOUNT=2, YQUOT=1. Hence, data of line addresses 0, 1, 2, and 3 are read out. When YCOUNT=3, YQUOT=2. At this time, data of line addresses 1, 2, 3, and 4 must be read out.

However, since the write process of data of line address=4 in the line buffer is in progress at that time, these data are not ready to be read out. Hence, the ENABLE signal generation circuit 602 outputs YEN=low to mask YFLAG (broken line portions of YFLAG in FIG. 9), thus pausing the count-up process of YCOUNT.

After that, when the write process of data of line address=4 is complete and these data are ready to be read out, YEN changes to high. In this way, upon setting the scale that enlarges the y-direction to 1.5×, the YEN signal is output in the pattern shown in FIG. 9. With this signal, YFLAG changes to control the count-up process of YCOUNT.

Figure 10:
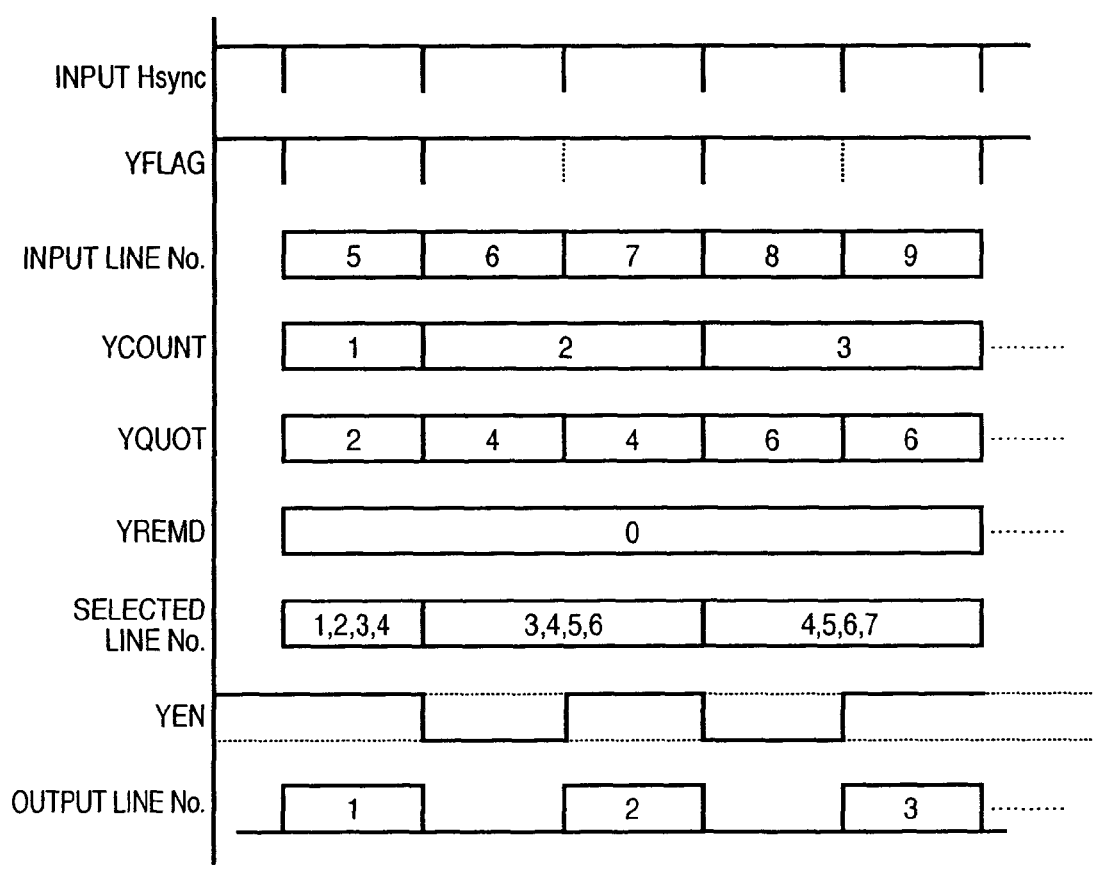
FIG. 10 is a timing chart upon setting ½× in the y-direction in a resolution conversion process of this embodiment.

FIG. 10 is a timing chart upon reducing the y-direction to ½×. In case of reduction, YFLAG is generated using input Hsync as a basic pattern. A signal obtained by data-masking that signal is output as YFLAG. In FIG. 10, when YCOUNT=1, YQUOT=2, data of line addresses 1, 2, 3, and 4 are read out.

Next, when YCOUNT=2, YQUOT=4. At this time, data of line addresses 3, 4, 5, and 6 must be read out. However, since the write process of input image data of line address=6 in the line buffer is in progress at that time, these data are not ready to be read out. Hence, the ENABLE signal generation circuit 602 outputs YEN=low to mask YFLAG (broken line portions of YFLAG in FIG. 10), thus pausing the count-up process of YCOUNT.

After that, when the write process of data of line address=6 is complete and data of line addresses 3, 4, 5, and 6 are ready to be read out, YEN changes to high. Hence, upon reducing the y-direction to ½×, the YEN signal is output in the pattern shown in FIG. 10. As a result, the ON timings of YFLAG change, thus controlling the count-up process of YCOUNT.

Figure 11:
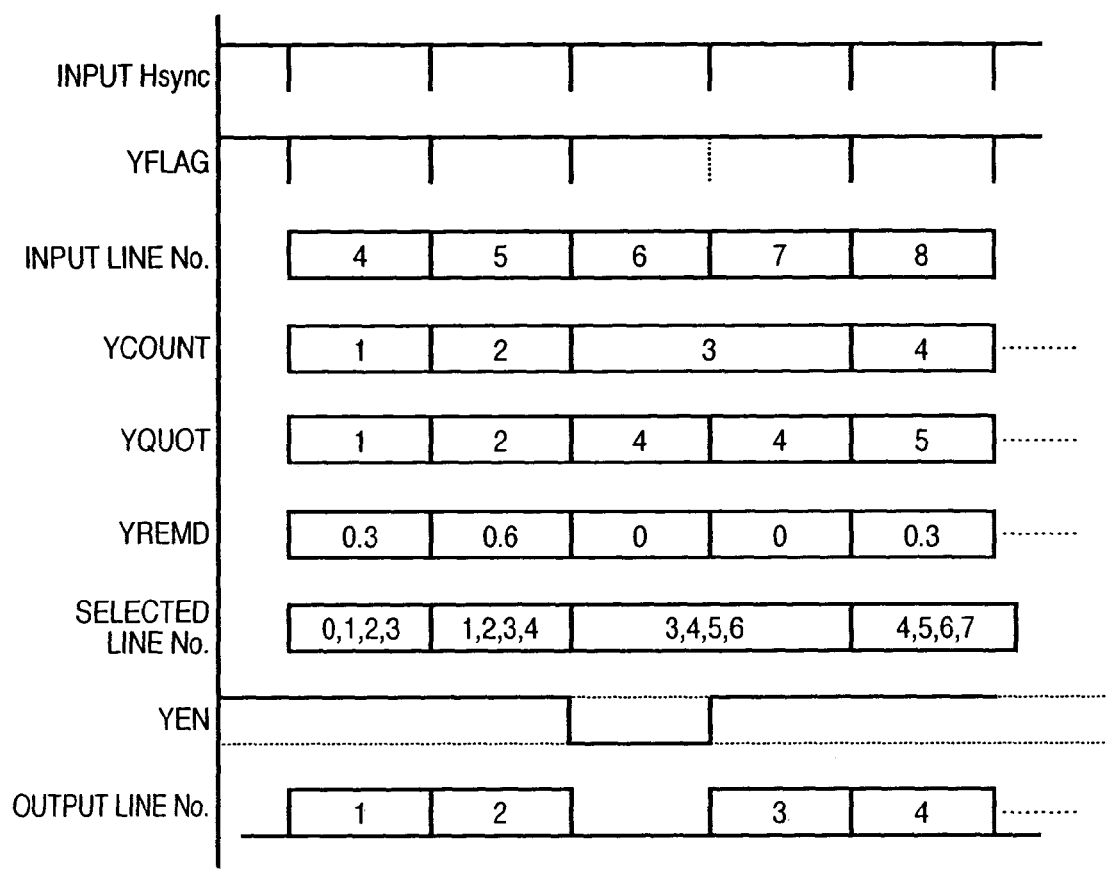
FIG. 11 is a timing chart upon setting ¾× in the y-direction in a resolution conversion process of this embodiment.

FIG. 11 is a timing chart upon reducing the y-direction to ¾×. Since this scale is also set to attain reduction, YFLAG is generated in the same manner as in FIG. 10.

In FIG. 11, when YCOUNT=1, YQUOT=1. Hence, data of line addresses 0, 1, 2, and 3 are read out. When YCOUNT=2, YQUOT=2. At this time, data of line addresses 1, 2, 3, and 4 are read out.

Next, when YCOUNT=3, YQUOT=4. At this time, data of line addresses 3, 4, 5, and 6 must be read out. However, since the write process of input image data of line address=6 in the line buffer is in progress at that time, these data are not ready to be read out.

Hence, the ENABLE signal generation circuit 602 outputs YEN=low to mask YFLAG (broken line portions of YFLAG in FIG. 11), thus pausing the count-up process of YCOUNT. After that, when the write process of data of line address=6 is complete and these data are ready to be read out, YEN changes to high.

Hence, upon reducing the y-direction to ¾×, the YEN signal is output in the pattern shown in FIG. 11. As a result, YFLAG changes to control the count-up process of YCOUNT.

With the above method, the count-up start timing of YCOUNT can be controlled at every scales.

Enlargement/reduction in the x-direction will be explained below.

Figure 12:
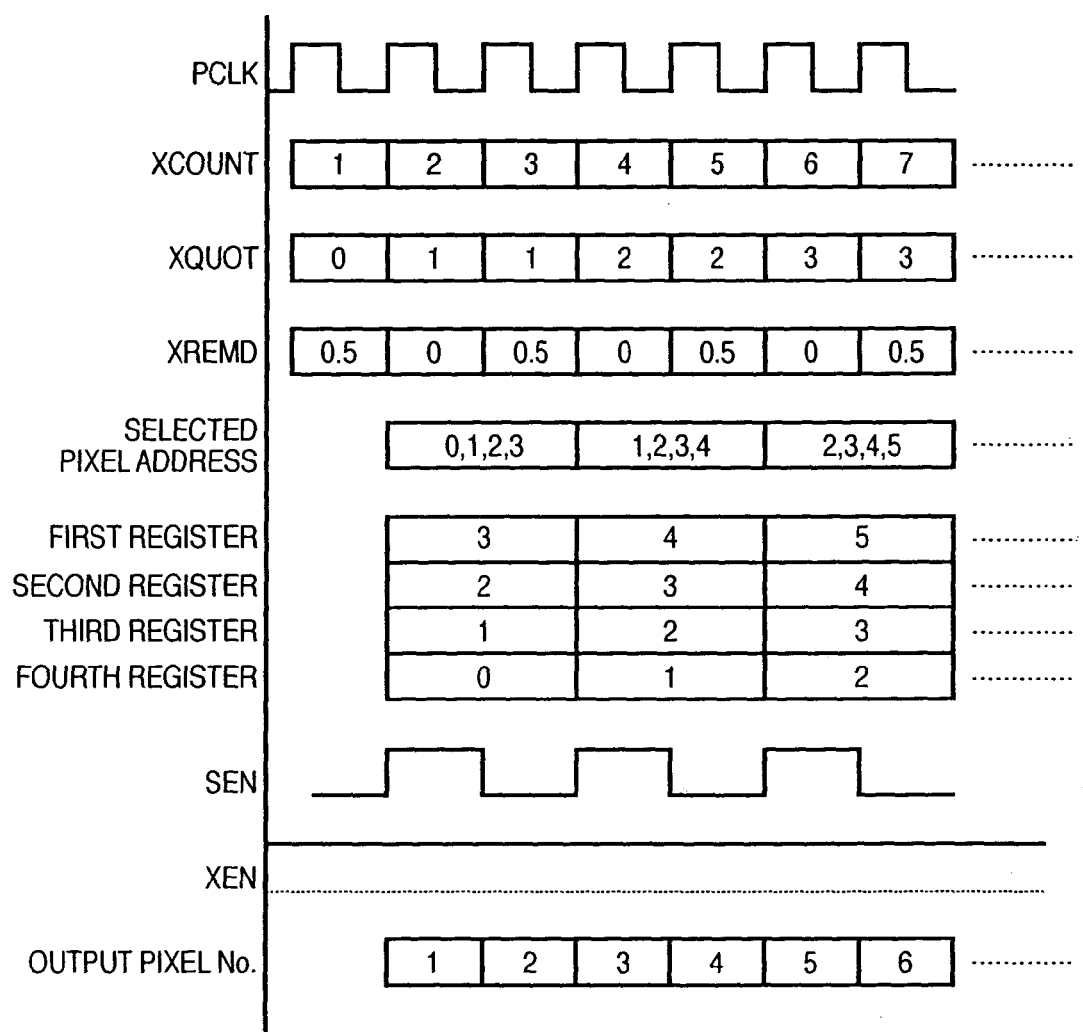
FIG. 12 is a timing chart upon setting 2× in the x-direction in a resolution conversion process of this embodiment.

FIG. 12 is a timing chart upon enlarging the x-direction to 2×. In FIG. 12, XCOUNT is a signal generated by the x-counter 501, and XQUOT and XREMD are signals generated by the divider 701 in FIG. 7. Also, SEN and XEN are signals generated by the ENABLE signal generation circuit 702.

In FIG. 12, when XCOUNT=2, XQUOT=1. Since selected pixel addresses indicate four pixels XQUOT−1, XQUOT, XQUOT+1, and XQUOT+2, pixel data of pixel addresses 0, 1, 2, and 3 are selected.

At this time, if the pixel address of data stored in the registers (404 to 407) of the arithmetic unit 105 are 0, 1, 2, and 3, SEN=high and XEN=high. Then, arithmetic operations are made using the data currently stored in the registers, and coefficient data (f(x1) to f(x4)) independently read out from the LUT 103 based on XREMD at that time, and the arithmetic operation result is output. Note that coefficient data f(y1) to f(y4) are acquired from the LUT 103 based on YREMD obtained from the YCOUNT value at that time.

When XCOUNT=3, XQUOT=1. In this case as well, pixel data of pixel addresses=0, 1, 2, and 3 are selected. At this time, since the selected pixel addresses are the same as those at the previous clock, SEN=low, and data in the first to fourth registers (404 to 407) are not replaced. However, since XREMD has changed, coefficient data are replaced. Hence, new arithmetic operations are made, and the arithmetic operation result is output.

When XCOUNT=4, XQUOT=2. In this case, pixel data of pixel addresses=1, 2, 3, and 4 are selected. At this time, since SEN=high and XEN=high, new data are read, and the registers are shifted. Then, arithmetic operations are made using these new register data and coefficient data which are independently read out from the LUT 103 based on XREMD, and the arithmetic operation result is output.

In this manner, pixel data which are enlarged to 2× in the x-direction are generated.

Figure 13:
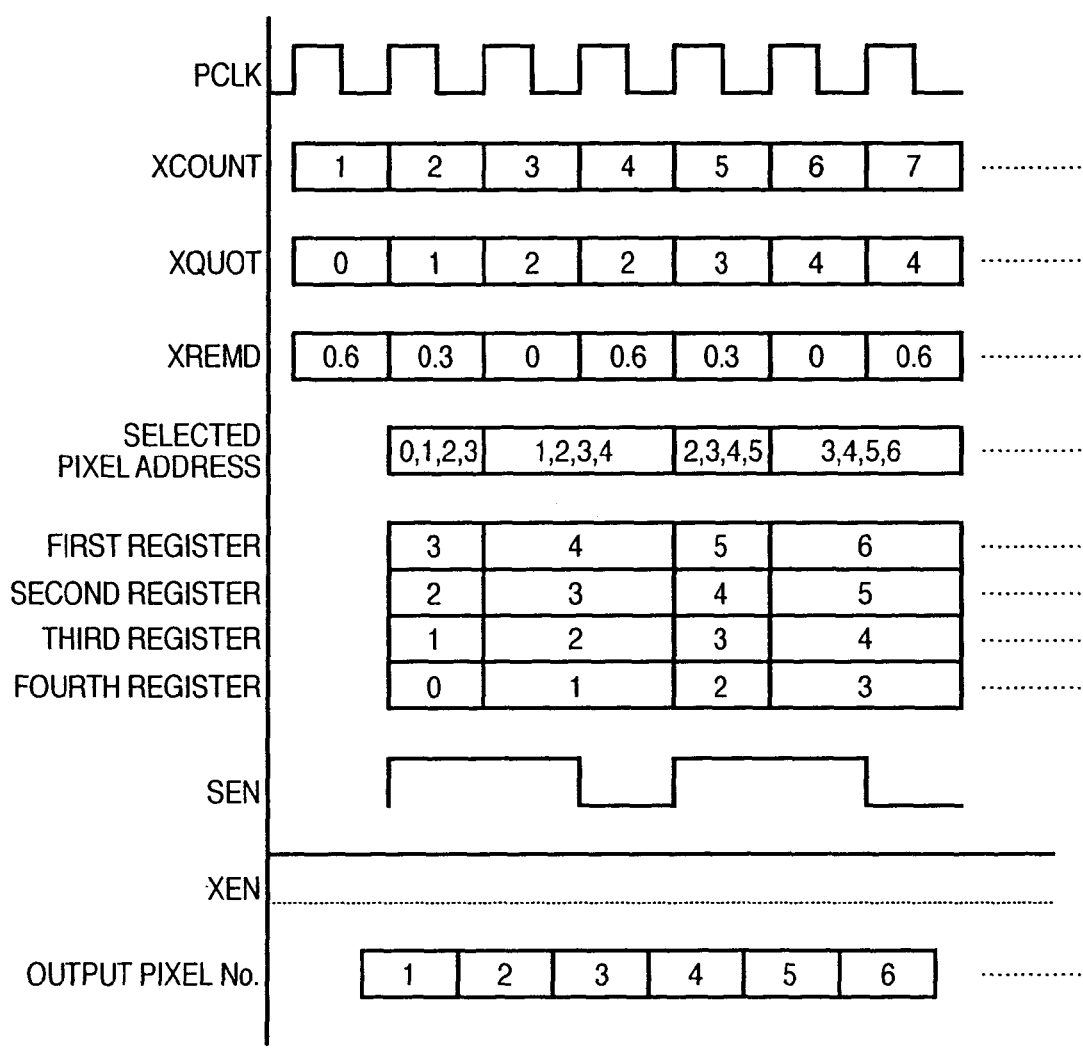
FIG. 13 is a timing chart upon setting 1.5× in the x-direction in a resolution conversion process of this embodiment.

FIG. 13 is a timing chart upon enlarging the x-direction to 1.5×.

In FIG. 13, when XCOUNT=2, XQUOT=1. Since selected pixel addresses indicate four pixels XQUOT−1, XQUOT, XQUOT+1, and XQUOT+2, pixel data of pixel addresses 0, 1, 2, and 3 are selected.

At this time, if the pixel address of data stored in the registers (404 to 407) of the arithmetic unit 105 are 0, 1, 2, and 3, SEN=high and XEN=high. Then, arithmetic operations are made using the data currently stored in the registers, and coefficient data independently read out from the LUT 103 based on XREMD at that time, and the arithmetic operation result is output.

When XCOUNT=3, XQUOT=2. In this case, pixel data of pixel addresses=1, 2, 3, and 4 are selected.

At this time, since SEN=high and XEN=high, new data are read, and the registers are shifted. Then, arithmetic operations are made using these new register data and independently readout coefficient data, and the arithmetic operation result is output.

When XCOUNT=4, XQUOT=2. In this case as well, pixel data of pixel addresses=1, 2, 3, and 4 are selected. At this time, since the selected pixel addresses are the same as those at the previous clock, SEN=low, and data in the first to fourth registers (404 to 407) are not replaced. However, since XREMD has changed, coefficient data are replaced. Hence, new arithmetic operations are made, and the arithmetic operation result is output.

In this manner, pixel data which are enlarged to 1.5× in the x-direction are generated.

Figure 14:
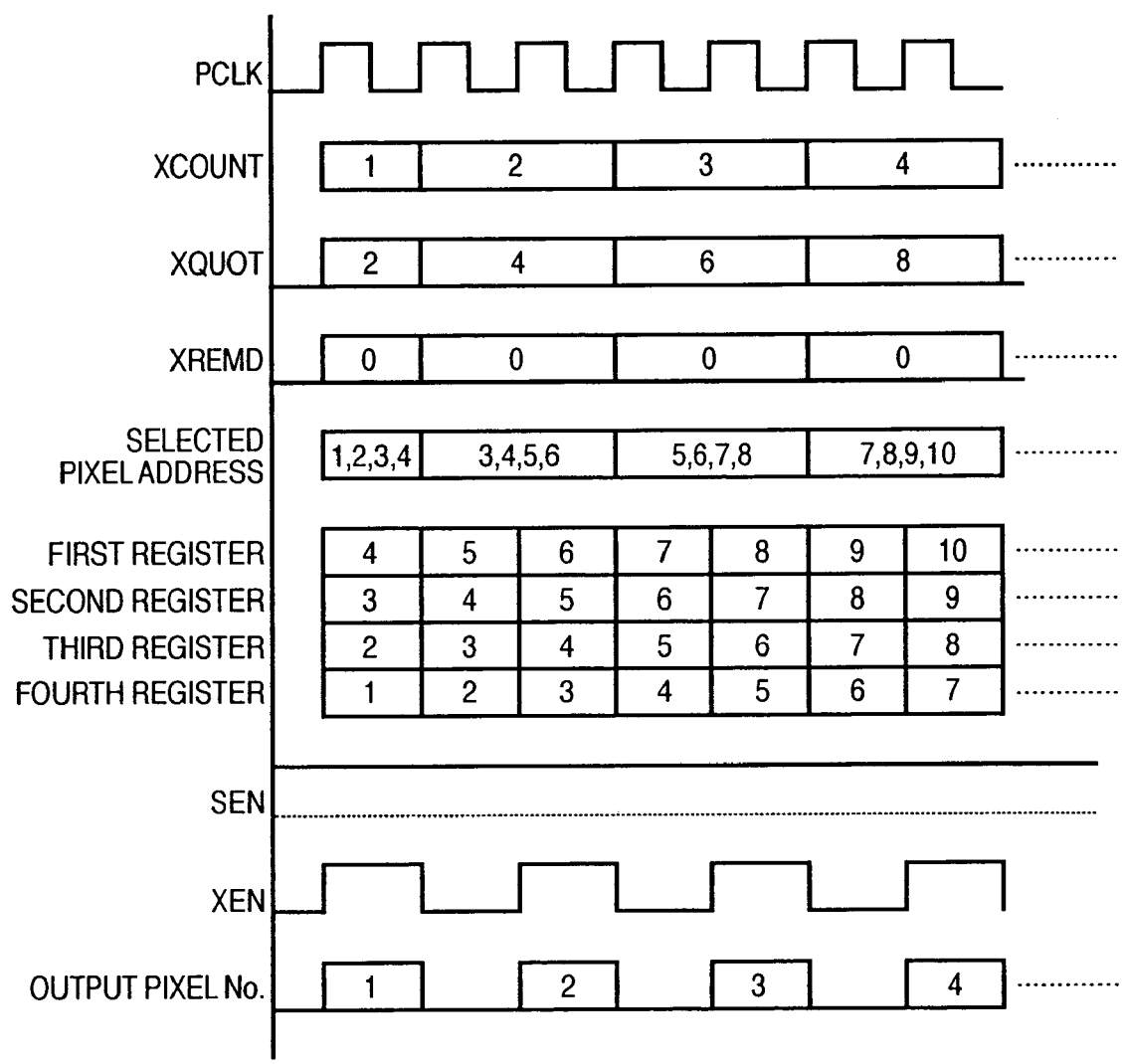
FIG. 14 is a timing chart upon setting ½× in the x-direction in a resolution conversion process of this embodiment.

FIG. 14 is a timing chart upon reducing the x-direction to ½×.

In FIG. 14, when XCOUNT=1, XQUOT=2. Hence, pixel data of pixel addresses=1, 2, 3, and 4 are selected. At this time, if the pixel address of data stored in the registers (404 to 407) of the arithmetic unit 105 are 1, 2, 3, and 4, SEN=high and XEN=high. Then, arithmetic operations are made using the data currently stored in the registers, and coefficient data independently read out from the LUT 103 based on XREMD at that time, and the arithmetic operation result is output.

Next, when XCOUNT=2, XQUOT=4. Hence, pixel data of pixel addresses=3, 4, 5, and 6 are selected. At this time, SEN=high to read new data, and the registers are shifted. However, the pixel addresses of the shifted registers are 2, 3, 4, and 5, and do not match the selected pixel addresses from XQUOT. Hence, XEN=low to pause the count-up process of XCOUNT.

Another pixel data is read in response to the next clock, and the registers are shifted. At this time, the pixel addresses of the registers are 3, 4, 5, and 6, and match the selected addresses. Hence, XEN=high, and arithmetic operations are made using these new register data and independently readout coefficient data, thus outputting the arithmetic result. In the column of "output pixel No.", no data is written in a memory in a low portion. This process is controlled by changing an ACT signal to low.

In this way, pixel data which are reduced to ½× in the x-direction are generated.

Figure 15:
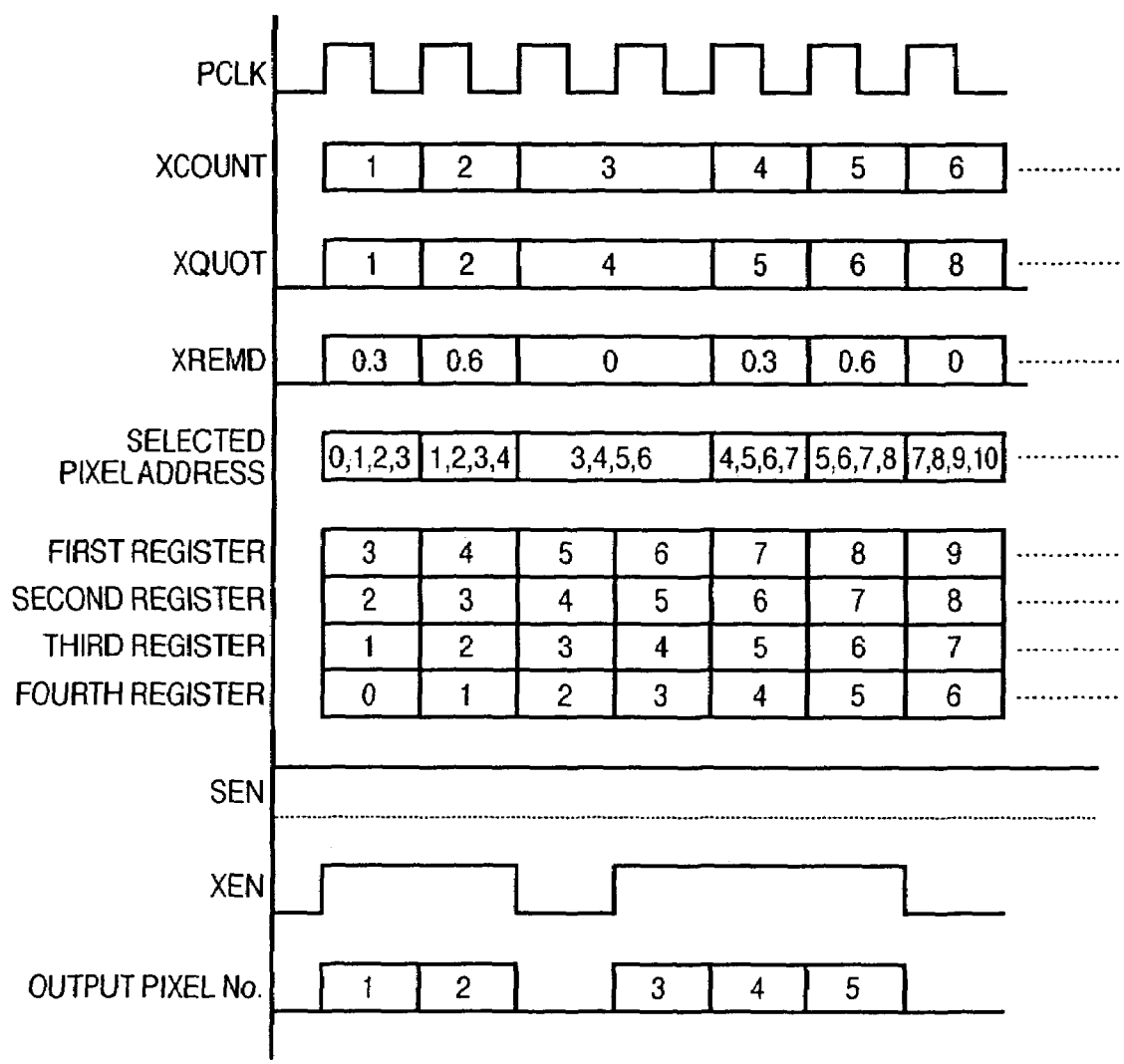
FIG. 15 is a timing chart upon setting ¾× in the x-direction in a resolution conversion process of this embodiment.

FIG. 15 is a timing chart upon reducing the x-direction to ¾×.

In FIG. 15, when XCOUNT=1, XQUOT=1. Hence, pixel data of pixel addresses=0, 1, 2, and 3 are selected. At this time, if the pixel address of data stored in the registers (404 to 407) of the arithmetic unit 105 are 0, 1, 2, and 3, SEN=high and XEN=high. Then, arithmetic operations are made using the data currently stored in the registers, and coefficient data independently read out from the LUT 103 based on XREMD at that time, and the arithmetic operation result is output.

Next, when XCOUNT=2, XQUOT=2. In this case, pixel data of pixel addresses 1, 2, 3, and 4 are selected. At this time, SEN=high to read new data, and the registers are shifted. The pixel addresses of data stored in the registers at that time are 1, 2, 3, and 4 and match the selected pixel addresses. Hence, arithmetic operations are made using these data, and the arithmetic operation result is output.

When XCOUNT=3, XQUOT=4. In this case, pixel data of pixel addresses=3, 4, 5, and 6 are selected. At this time, SEN=high to read new data, and the registers are shifted. However, the pixel addresses of the shifted registers are 2, 3, 4, and 5, and do not match the selected pixel addresses from XQUOT. Hence, XEN=low to pause the count-up process of XCOUNT.

Another pixel data is read in response to the next clock, and the registers are shifted. At this time, the pixel addresses of the registers are 3, 4, 5, and 6, and match the selected addresses. Hence, XEN=high, and arithmetic operations are made using these new register data and independently readout coefficient data, thus outputting the arithmetic result.

In this way, pixel data which are reduced to ¾× in the x-direction are generated.

The aforementioned operations will be summarized below. That is, XQUOT requests four pixel data XQUOT−1, XQUOT, XQUOT+1, and XQUOT+2. However, since data in the x-direction are to be read out from one line buffer, only one data can be read out by one CLK in this embodiment. Hence, as has been explained using FIG. 4, a method of storing readout data in the registers in turn is adopted. In this case, data that has undergone the arithmetic operation in the y-direction is stored in the register as data in the x-direction. Before data requested by XQUOT are stored, XEN=low to stop arithmetic operations and to stop the count-up process of XCOUNT, thus preventing the XQUOT value from changing. In case of reduction, since XQUOT is ahead of data stored in the registers, SEN is always high to read out data for each CLK. By contrast, in case of enlargement, since data stored in the line buffers are ahead of a change in XQUOT, timing control is made by changing SEN. With this method, the count-up start timing of XCOUNT can be controlled at every scales.

As described above, according to this embodiment, an enlargement/reduction arithmetic circuit which refers to a plurality of pixel data like 3D convolution arithmetic operations can be implemented by a single arithmetic circuit.

As described above, according to the present invention, a single arithmetic circuit can cope with a plurality of resolutions using line buffers.

Also, according to the present invention, the arrangement using line buffers and a single arithmetic circuit can cope with a plurality of different types of resolution conversion using 3D convolution arithmetic operations.

As many apparently widely different embodiments of the present invention can be made without departing from the spirit and scope thereof, it is to be understood that the invention is not limited to the specific embodiments thereof except as defined in the claims.

What is claimed is:

1. A resolution conversion device comprising:
    a plurality of line buffers for sequentially storing pixel values of first image data for respective lines in synchronism with pixel clocks and a horizontal sync signal;
    a generation unit configured to sequentially generate a coordinate value used to specify a pixel position in second image data on the basis of a count value of predetermined clocks and the horizontal sync signal;
    a conversion unit configured to convert the coordinate value generated by said generation unit into a pixel position in the first image data on the basis of a scale value of resolution conversion;
    an arithmetic unit configured to acquire pixel values of pixels required for an arithmetic operation from said plurality of line buffers on the basis of the pixel position obtained by said conversion unit, and calculating a pixel value of a pixel corresponding to the coordinate value; and
    a stop unit configured to, when said arithmetic unit is not ready to execute the arithmetic operation of a pixel value, stop generation of the coordinate value by said generation unit until said arithmetic unit is ready to execute the arithmetic operation.

2. The device according to claim 1, wherein said conversion unit obtains the pixel position in the first image data using an integral part of a quotient obtained by dividing the coordinate value by the scale value.

3. The device according to claim 2, wherein said arithmetic unit changes a coefficient used to calculate the pixel value of the pixel corresponding to the coordinate value on the basis of a decimal part obtained by the division of said conversion unit.

4. The device according to claim 1, wherein said generation unit comprises:
    a deriving unit for generating a pseudo horizontal sync signal on the basis of the horizontal sync signal, the predetermined clocks, and the scale;
    a first counter which is cleared in response to the pseudo horizontal sync signal, and is used to count the predetermined clocks; and
    a second counter which counts the pseudo horizontal sync signal, and
    said generation unit uses count values of said first and second counters as the coordinate value.

5. The device according to claim 4, wherein said stop unit stops a count operation of said second counter when an input process of a line including pixels required for the arithmetic operation of said arithmetic unit to said plurality of line buffers is not complete.

6. The device according to claim 4, wherein said stop unit stops a count operation of said first counter when the arithmetic operation of said arithmetic unit does not follow.

7. A resolution conversion method comprising:
    a storage step of sequentially storing pixel values of first image data in a plurality of line buffers for respective lines in synchronism with pixel clocks and a horizontal sync signal;
    a generation step of sequentially generating a coordinate value used to specify a pixel position in second image data on the basis of a count value of predetermined clocks and the horizontal sync signal;
    a conversion step of converting the coordinate value generated in the generation step into a pixel position in the first image data on the basis of a scale value of resolution conversion;
    an arithmetic step of acquiring pixel values of pixels required for an arithmetic operation from the plurality of line buffers on the basis of the pixel position obtained in the conversion step, and calculating a pixel value of a pixel corresponding to the coordinate value; and
    a stop step of stopping, when the arithmetic operation of a pixel value is not ready to execute in the arithmetic step, stopping generation of the coordinate value in the generation step until the arithmetic operation of a pixel value is ready to execute in the arithmetic step.

8. The method according to claim 7, wherein the conversion step includes a step of obtaining the pixel position in the first image data using an integral part of a quotient obtained by dividing the coordinate value by the scale value.

9. The method according to claim 8, wherein the arithmetic step includes a step of changing a coefficient used to calculate the pixel value of the pixel corresponding to the coordinate value on the basis of a decimal part obtained by the division in the conversion step.

10. The method according to claim 7, wherein the generation step comprises:
    a deriving step of deriving a pseudo horizontal sync signal on the basis of the horizontal sync signal, the predetermined clocks, and the scale;
    a first counter step of counting the predetermined clocks, a count value being cleared in response to the pseudo horizontal sync signal; and
    a second counter step of counting the pseudo horizontal sync signal, and
    the generation step uses count values of the first and second counter steps as the coordinate value.

11. The method according to claim 10, wherein the stop step includes a step of stopping a count operation in the second counter step when an input process of a line including pixels required for the arithmetic operation in the arithmetic step to the plurality of line buffers is not complete.

12. The method according to claim 10, wherein the stop step includes a step of stopping a count operation in the first counter step when the arithmetic operation in the arithmetic step does not follow.

13. An information processing apparatus comprising:
a resolution conversion device of claim 1;
a unit configured to input image data to be displayed to said resolution conversion device as the first image data;
a buffer for holding second image data obtained by said resolution conversion device; and
a display unit configured to display the second image data stored in said buffer.

* * * * *

UNITED STATES PATENT AND TRADEMARK OFFICE
CERTIFICATE OF CORRECTION

PATENT NO. : 7,050,077 B2 Page 1 of 1
APPLICATION NO. : 10/653902
DATED : May 23, 2006
INVENTOR(S) : Kenji Inoue et al.

It is certified that error appears in the above-identified patent and that said Letters Patent is hereby corrected as shown below:

COLUMN 1
Line 58, "An" should begin a new paragraph.

COLUMN 4
Line 59, "1.5×in" should read --1.5× in--.

COLUMN 7
Line 47, "L, and" should read --1, and--.

COLUMN 10
Lines 56-57 ("numeral 701...circuit of the") should be in the same paragraph. -- and 702, an ENABLE etc. -- should follow in one paragraph COLUMN 11
Line 37, "1×%YZOOM%2×," should read --1 × $\leq$YZOOM$\leq$2×,--.
Line 44, "%3×," should read --$\leq$3×,--.

COLUMN 12
Lines 5-6 should be in the same paragraph. After --OUT. However, etc. -- should follow as one paragraph
Lines 51-52 ("ready to be...outputs") should be in the same paragraph.

COLUMN 13
Lines 49-50 ("of pixel addresses...new data") should be in the same paragraph.

Signed and Sealed this

Second Day of January, 2007

JON W. DUDAS
*Director of the United States Patent and Trademark Office*